United States Patent
Ng et al.

(10) Patent No.: US 9,101,968 B2
(45) Date of Patent: Aug. 11, 2015

(54) ALL-WEATHER LANDFILL SOIL COVER SYSTEM FOR PREVENTING WATER INFILTRATION AND LANDFILL GAS EMISSION

(71) Applicant: THE HONG KONG UNIVERSITY OF SCIENCE AND TECHNOLOGY, Kowloon, Hong Kong (CN)

(72) Inventors: Charles Wang Wai Ng, Hong Kong (CN); Jie Xu, Hong Kong (CN); Rui Chen, Shenzhen Guangdong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 95 days.

(21) Appl. No.: 13/957,547

(22) Filed: Aug. 2, 2013

(65) Prior Publication Data

US 2014/0037379 A1    Feb. 6, 2014

Related U.S. Application Data

(60) Provisional application No. 61/679,937, filed on Aug. 6, 2012.

(51) Int. Cl.
*E02B 11/00* (2006.01)
*B09B 1/00* (2006.01)

(52) U.S. Cl.
CPC .............. *B09B 1/004* (2013.01); *E02B 11/005* (2013.01); *Y02W 30/32* (2015.05)

(58) Field of Classification Search
USPC .............................. 405/129.9, 129.95, 129.45
See application file for complete search history.

(56) References Cited

U.S. PATENT DOCUMENTS 5,468,291 A    11/1995    Waterson et al.
5,855,664 A    1/1999     Bielecki et al.
(Continued)

FOREIGN PATENT DOCUMENTS

CN    102493496 A    12/2011
DE    3415729 A1    9/1984
(Continued)

OTHER PUBLICATIONS

Landfill Technical Guidance Manual, May 1997, Massachusetts Department of Environmental Protection, pp. 1-20-1-30.*
(Continued)

*Primary Examiner* — Benjamin Fiorello
*Assistant Examiner* — Kyle Armstrong
(74) *Attorney, Agent, or Firm* — Nath, Goldberg & Meyer; Jerald L. Meyer; Stanley N. Protigal (57) ABSTRACT

A landfill soil cover system is proposed for preventing water infiltration into a landfill and gas emission from the landfill under all weather conditions. The landfill cover system comprises three soil layers; namely, a clay layer, a gravelly sand layer and a silt layer, compacted successively from the bottom to the top of the system. The clay layer is compacted immediately above an optional gas collection layer and landfill waste at an optimum water content. Additionally, a trench for water drainage may be constructed, for example, every 20-40 m in the horizontal direction. Water infiltration and landfill gas emission can be prevented effectively by this landfill soil cover system under any humid, semi-arid and arid climates.

13 Claims, 4 Drawing Sheets

(56) References Cited

U.S. PATENT DOCUMENTS

| | | | |
|---|---|---|---|
| 6,082,929 A * | 7/2000 | Williams | 405/129.55 |
| 2005/0158123 A1 * | 7/2005 | Ianniello et al. | 405/129.95 |
| 2005/0220542 A1 | 10/2005 | Marsh et al. | |
| 2011/0045580 A1 * | 2/2011 | Hater et al. | 435/290.4 |
| 2011/0174378 A1 * | 7/2011 | Leung | 137/1 |

FOREIGN PATENT DOCUMENTS

| | | |
|---|---|---|
| KR | 1020000030515 | 6/2000 |
| KR | 1020040036037 B1 | 3/2005 |
| KR | 1020050095048 B1 | 3/2006 |
| KR | 100699925 B1 | 3/2007 |
| WO | 94/20689 A1 | 9/1994 |

OTHER PUBLICATIONS

Dr. Pengfei Zhang, Darcy's Law and Hydraulic Conductivity, EAS 44600 Groundwater Hydrology.*

Albrecht, B. & Benson, C. (2001). Effect of Desiccation on Compacted Natural Clays. Journal of Geotechnical and Geoenvironmental Engineering, ASCE, 127(1), 67-75.

Stark, T. D., Arellano, D., Evans, W. D., Wilson, V. L., and Gonda, J. M. (1998). Unreinforced geosynthetic clay liner case history. Geosynthetics International, 5(5), 521-544.

Stark, T., Choi, H., Lee, C. & Queen, B. (2012). Compacted soil liner interface strength importance. Journal of Geotechnical and Geoenvironmental Engineering, ASCE, 138(4), 544-550.

Benson, C. H. & Khire, M. V. (1995). Earthen covers for semi-arid and arid climates. Geotechnical Special Publication, No. 53, 201-217.

Khire, M. V., Benson, C. H. & Bosscher, P. J. (2000). Capillary barriers: design variables and water balance. Journal of Geotechnical and Geoenvironmental Engineering, ASCE, 126(8): 695-708.

Aubertin, M., Cifuentes, E., Apithy, S. A., Bussiere, B., Molson, J. & Chapuis, R. P. (2009), Analyses of water diversion along inclined covers with capillary barrier effects. Canadian Geotechnical Journal, 46(10), 1146-1164.

Rahardjo, H., Santoso, V. A., Leong, E. C., Ng, Y. S. & Hua, C. J. (2012). Performance of an instrumented slope covered by a capillary barrier system. Journal of Geotechnical and Geoenvironmental Engineering, ASCE, 138(4), 481-490.

Stormonont, J. C. & Morris, C. E. (1997). Unsaturated drainage layers for diversion of infiltrating water. Journal of Irrigation and Drainage Engineering, ASCE, 123(5), 364-367.

Wei, H. Y., "Experimental and numerical study on gas migration in landfill of municipal solid waste" PhD thesis, Zhejiang University, China (2007).

Ng, C. W. W. & Menzies, B., "Advanced Unsaturated Soil Mechanics and Engineering" Taylor & Francis, London and NY. (2007) ISBN: 978-0-415-43679-3.

R.L. Lopes, M.C.M. Alves, J.F.T. Jucá, "Water infiltration and methane emission through three different cover layers of an experimental Municipal Waste Landfill at Muribeca, Recife, Pernambuco, Brazil", Unsaturated Soils—Alonso & Gens (eds) (2011), pp. 1407- 1412, ISBN 978-0-415-60428-4.

Seheum Moon, Kyoungphile Nam, JaeYoung Kim, Shim Kyu Hwan, Moonkyung Chung, "Effectiveness of compacted soil liner as a gas barrier layer in the landfill final cover system" Waste Management 28 (2008) 1909-1914.

A. B. Fourie and J. W. F. Morris, "Measured gas emissions from four landfills in South Africa and some implications for landfill design and methane recovery in semi-arid climates", Waste Manag Res 2004 22: 440, DOI: 10.1177/0734242X04048332.

Craig H. Benson; Patricia A. Thorstad; Ho-Young Jo; and Steven A. Rock, J., "Hydraulic Performance of Geosynthetic Clay Liners in a Landfill Final Cover" Geotech. Geoenviron. Eng. 2007.133:814-827.

Deng, L.H., Zhan, L.T., Chen, Y.M. & Jia, G.W. (2012). Model tests on capillary-barrier cover with unsaturated drainage layer. Chinese Journal of Geotechnical Engineering, vol. 34 No. 1, pp. 75-80 (Jan. 2012).

Benson C.H., Albright W.H., Roesler, A.C. Abichou, T. 2002. Evaluation of Final Cover Performance: Field Data from the Alternative Cover Assessment Program (ACAP). WM '02 Conference, Feb. 24-28, 2002 Tucson AZ.

* cited by examiner

ALL-WEATHER LANDFILL SOIL COVER SYSTEM FOR PREVENTING WATER INFILTRATION AND LANDFILL GAS EMISSION

RELATED APPLICATION

The present Patent Application claims priority to Provisional Patent Application No. 61/679,937 filed Aug. 6, 2012, which is assigned to the assignee hereof and filed by the inventors hereof and which is incorporated by reference herein.

BACKGROUND

1. Field

This disclosure concerns a landfill cover system, more specifically to a landfill soil cover system for preventing water infiltration into a landfill and gas emission from the landfill under all weather conditions (i.e., any humid, semi-arid and arid climates).

2. Background

Landfilling is one major solution to manage municipal solid wastes in the world. Landfill waste can generate large amount of leachate and landfill gas. Water infiltration increases the rate and the amount of leachate generation and the risk of groundwater contamination. Landfill gas (mainly consists of $CO_2$ and $CH_4$) emission intensifies global warming, air pollution and may even cause fire and explosions. It is necessary, therefore, to develop and design a cover system for preventing water infiltration into a landfill, and gas emission from it. Preventing water infiltration into a landfill will reduce leachate.

A landfill normally has both flat and sloping topography. Conventional landfill covers often consist of compacted clay barriers or composite liners, which is made of geomembrane and compacted clay. The design of a compacted clay aims to meet the hydraulic criteria of a landfill cover systems; however, long-term hydraulic performance of compacted clay diminishes with time due to desiccation cracking, differential settlement, and wetting-drying cycle effects. Field studies have shown that desiccation can induce severe cracking of unprotected clay barriers which can create preferential flow into landfill wastes. It has been suggested that composite liners may be substituted over compacted clay. However, composite liners are not only expensive but also more susceptible to construction damage or post construction puncture due to its thin layer. Moreover, shear resistance between the interface of composite liner and soil is usually lower than soil internal shear resistance. There have been many examples of landfill instability problems caused by weak geosynthetic interfaces. Furthermore, the maintenance costs of this type of composite barrier are relatively high and the service life of geomembrane is relatively short. Therefore, some alternative covers are considered and used.

One alternative system is evapotranspiration (ET) cover, which generally consists of a thick layer of fine-grained soil with plants. A modification of this type of monolithic ET cover is a capillary barrier, which has gained popularity in arid regions. A capillary barrier is an earth cover system, which consists of two soil layers; that is, a fine-grained soil overlying a coarse-grained soil. The fundamental principle of a capillary barrier is to make use of contrasting unsaturated hydraulic properties of the two different soils to minimize rainfall infiltration and to drain away any infiltrated water quickly. It has been demonstrated that a capillary barrier performs well in arid and semi-arid regions, but not in humid areas and saturated ground conditions.

Some researchers proposed adding an unsaturated drainage layer between fine-grained and coarse-grained soil layers in a capillary barrier to increase the lateral drainage capability, to make the capillary barrier system applicable to landfills in relatively humid areas. This kind of modified capillary barrier system consists of three soil layers with saturated water permeability increasing successively from the top to the bottom (i.e., particle size increases with depth), but it is still only applicable to relatively arid and semi-arid conditions. When cover soils reach nearly saturated and saturated conditions (i.e., wet conditions) under heavy or prolonged rainfalls, it is clear that this type of cover system cannot effectively prevent water infiltration into landfill waste. In addition, this kind of modified capillary system may be only feasible for a sloping surface of a landfill, as its performance on flat surface of a landfill is questionable since the lateral drainage capability of the bottom coarse-grained soil cannot fit its functionality effectively.

Another issue with this type of modified capillary barrier system and with conventional barrier systems is that they cannot prevent gas emission from a municipal waste landfill. Capillary landfill cover systems have been unable to prevent water infiltration and landfill gas emission under all weather conditions (i.e., at any humid and arid climates) in the long term, especially when cover soils are nearly saturated and saturated.

In general, no capillary landfill cover system has demonstrated a capability to prevent water infiltration and landfill gas emission under all weather conditions (i.e., at any humid, semi-arid and arid climates) on a long-term basis, especially when cover soils are nearly saturated and saturated.

SUMMARY

A method and system for covering landfills is provided by preparing a flat or sloping surface of landfill waste. A clay layer is deposited and compacted over the surface of the landfill waste at an optimum water content of the clay. A gravelly sand layer is deposited and compacted over above the clay surface. A silt layer is deposited and compacted over above the gravelly sand surface.

The system provides an all-weather landfill soil cover system, which prevents water infiltration and gas emission from a landfill underneath in different climates and weather conditions, including humid, semi-arid and arid climates.

DETAILED DESCRIPTION

Overview

A landfill cover system comprises three soil layers; namely, a clay layer, a gravelly sand layer and a silt layer, compacted successively from the bottom to the top of the system. The clay layer is compacted immediately above an optional gas collection layer and landfill waste at an optimum water content that has a thickness between 0.3 m and 0.8 m with particle size less than 0.075 mm and saturated water permeability not higher than $1 \times 10^{-9}$ m/s. The thickness of compacted gravelly sand layer falls between 0.2 m and 0.3 m with particle sizes ranging from 0.5 to 5 mm and saturated water permeability not lower than $1 \times 10^{-4}$ m/s. The thickness of compacted silt layer ranges between 0.3 m and 0.6 m with particle sizes less than 2 mm and saturated water permeability ranging from $1 \times 10^{-8}$ to $1 \times 10^{-5}$ m/s. Additionally, a trench for water drainage is constructed every 20-40 m in the horizontal direction.

A landfill generally has both flat and sloping topography. Conventional landfill cover systems often consist of a compacted clay barrier or composite barrier, which is made of geomembrane and compacted clay. All these designs aim at limiting water infiltration into a waste mass and landfill gas emission by making use of the low permeability of the compacted clay and geomembrane.

An all-weather landfill soil cover system prevents water infiltration and gas emission from a landfill underneath in different climates and weather conditions, including humid and arid climates. The disclosed landfill soil cover system primarily includes three soil layers; namely, a clay layer, a gravelly sand layer and a silt layer, compacted successively from the bottom to the top of the system. The saturated water permeability of the three soil layers increases first and then decreases from the top to the bottom (i.e., particle size increases first and then decreases with depth). In this configuration, a layer of clay is compacted beneath a capillary barrier made of a silt layer overlying a gravelly sand layer, which can prevent water infiltration at relatively dry conditions. Water infiltration at relatively wet and saturated conditions and landfill gas emission are prevented by introducing this compacted bottom clay layer. The materials for constructing the disclosed landfill soil cover system are all natural soils, which can all be obtained conveniently. The construction of the disclosed landfill soil cover system is simple and the maintenance cost is low. The long-term performance of the disclosed landfill soil cover system is excellent since all components of the system are made of natural materials.

One significant aspect of the disclosed technology is in overcoming the shortcomings of conventional landfill covers by introducing an additional layer of compacted clay beneath a capillary barrier system, which is made of a layer of silt overlying a layer of gravelly sand. Gravelly sand contains 25 to 50% (by volume) gravel. Additionally, sandy substrates containing 5% to 30% (by volume) gravel can be considered as gravelly sand. A variation of gravelly sand, known as sandy gravel contains 50 to 75% (by volume) gravel. For purposes of this disclosure, any sand-based substrate material containing from 5% to 75% (by volume) gravel can be used as gravelly sand, provided that the saturated water permeability of the substrate is between $1 \times 10^{-4}$ m/s and $1 \times 10^{-2}$ m/s.

Figure 1:
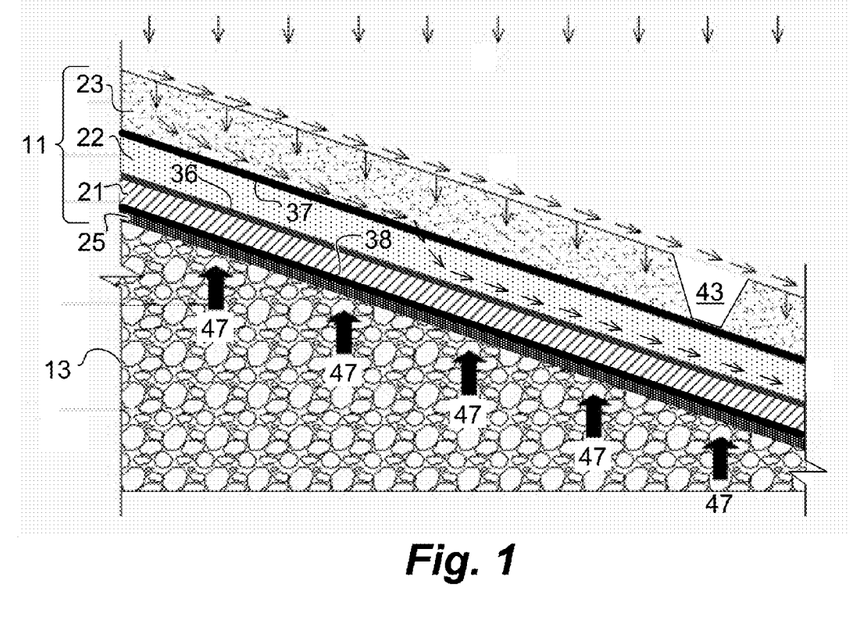
FIG. 1 is a schematic diagram of the disclosed landfill soil cover system and its working principle of preventing water infiltration and landfill gas emission.

An all-weather landfill soil cover system includes a compacted clay layer, a gravelly sand layer and a silt layer, compacted successively from the bottom to the top of the system, as shown in FIG. 1. In other words, a layer of clay is compacted beneath a capillary barrier made of a silt layer overlying a gravelly sand layer.

The clay layer is compacted at its optimum water content immediately above a gas collection layer covering landfill waste, where the optimum water content is the content of water in soil at which the maximum dry density of soil can be attained as a result of a given compaction effort. Optimum water content is the content of water in soil at which the maximum dry density of soil can be attained as a result of a given compaction effort. The optimum water content of a soil can be determined according to ASTM D698-12 Standard Test Methods for Laboratory Compaction Characteristics of Soil Using Standard Effort, as 12,400 ft-lb/ft$^3$ or 600 kN-m/m$^3$.

The construction method for the disclosed landfill soil cover system includes the following steps:

(1) Prepare flat or sloping surface of landfill waste of a landfill for compaction;
(2) Compact a gas collection layer which is made of gravels over (above) the surface of the landfill waste. This step is optionally carried out in accordance with the particular conditions of the landfill and the landfill cover;
(3) Compact a clay layer immediately over (above) the gas collection layer (if any) at the optimum water content of the clay;
(4) Compact a gravelly sand layer over (above) the clay surface;
(5) Compact a silt layer over (above) the gravelly sandy surface.

After construction, the landfill soil cover system prevents water infiltration into a landfill underneath, under all weather conditions (i.e., any humid and arid climates). Any infiltrated water in the gravelly sand layer is stopped by the bottom clay layer and is diverted and retained at a nearby storage location and conveniently allowed to evaporate, discharged or re-cycled to the landfill cover.

The long-term performance of the disclosed landfill soil cover system is excellent since it is made of natural soils.

The construction of the disclosed landfill soil cover system is simple and hence the costs of construction and maintenance can be low.

The disclosed landfill soil cover system can be applied to both flat and sloping surfaces of a landfill.

EXAMPLES

FIG. 1 is a schematic diagram of the disclosed landfill soil cover system 11 and its working principle of preventing water infiltration and landfill gas emission. Depicted are landfill waste 13 covered by landfill soil cover system 11. Landfill cover system comprises three soil layers; namely compacted clay layer 21, gravelly sand layer 22 and silt layer 23. The configuration is such that clay layer 21 is compacted beneath a capillary barrier made of gravelly sand layer 22 overlaid by silt layer 23.

Clay layer 21 is compacted at its optimum water content immediately above landfill waste. Optimum water content is the content of water in soil at which the maximum dry density can be attained as a result of a given compaction effort. The maximum dry density and the optimum water content of a soil can be determined from the standard Proctor compaction test (ASTM D698-12 Standard Test Methods for Laboratory Compaction Characteristics of Soil Using Standard Effort (2012)), which is 12,400 ft-lb/ft$^3$ or 600 kN-m/m$^3$).

In FIG. 1, water seepage through layers 21, 22, 23 is represented by the thin arrows, and will be described with respect to different climatic and weather conditions.

The thickness of compacted clay layer 21 lies between 0.3 m and 0.8 m with clay particle sizes less than 0.075 mm and the saturated water permeability not higher than $1\times10^{-9}$ m/s. The range of saturated water permeability of compacted clay layer 21 lies between $1\times10^{-10}$ m/s and $1\times10^{-9}$ m/s. The thickness of compacted gravelly sand layer 22 falls between 0.2 m and 0.3 m with particle sizes ranging from 0.5 to 5 mm and the saturated water permeability not lower than $1\times10^{-4}$ m/s. The range of saturated water permeability of gravelly sand layer 22 lies between $1\times10^{-4}$ m/s and $1\times10^{-2}$ m/s. The thickness of compacted silt layer 23 falls between 0.3 m and 0.6 m with particle sizes less than 2 mm and the saturated water permeability ranging from $1\times10^{-8}$ to $1\times10^{-5}$ m/s. Water permeability means an average speed of water seeping through a soil. Saturated water permeability refers to the water permeability when soil is saturated (i.e., soil voids are filled with water). The range of each soil thickness needed can be verified and determined from a numerical parametric study using a commercial software (e.g., Geostudio2007™ from GEO-SLOPE International Ltd.). A numerical parametric study was carried out with different soil thicknesses and water permeability functions. The range of each soil layer 21, 22, 23 was determined according to when the best performance of the landfill soil cover system was achieved. The performance of a cover system 11 is assessed in terms of preventing water infiltration from the top and landfill gas emission from the bottom. Silt is a granular material of a size somewhere between sand and clay particles.

In describing the particle sizes of the layers 21, 22, 23, it is accepted that the materials will not be laboratory grade soils, and it is expected that there will be a significant amount of particles which will exceed the described limits. In reciting the ranges, it is intended to describe the materials within commercial specifications. Therefore, the specifications of particle sizes and other physical characteristics of the soils will be met if the permeability and saturation characteristics of the soils substantially meet the characteristics of soils having the recited dimensions. Similarly, it is expected that the soils will be deposited and compacted by earthmoving equipment typically used at landfill sites, and the underlying landfill waste will be non-uniform in constituency. Therefore, there will be localized variations in thicknesses.

In one configuration, gas collection layer 25 is provided between the landfill waste 13 and the first clay layer 21.

The disclosed landfill soil cover system can be applied to both flat and sloping surface of a landfill. The slope angle of the landfill soil cover system should not be steeper than a vertical (V) to horizontal (H) ratio of 1V:3 H.

In addition, when the contrast of particle sizes of two successive soil layers is too large, fine soil particles may migrate into the coarser soil layer, so a layer of geotextile can be placed in between of the two successive soil layers. For example, when the average particle size of gravelly sand layer 22 is five times larger than that of clay layer 21, a layer of geotextile 36 can be placed between the compacted clay and gravelly sand layers 21, 22. Similarly, when the average particle size of gravelly sand layer 22 is five times larger than that of silt layer 23, a second layer of geotextile 37 can be placed between the gravelly sand and silt layers 22, 23. It is also possible to provide further layers of geotextile, for example, a layer of geotextile 38 can be used for separating compacted clay layer 21 from the gas collection layer 25 (if any) or landfill waste 13.

The disclosed landfill soil cover system 11 is constructed according to the following steps:

Prepare flat or sloping surface of landfill waste 13;

Compact a gas collection layer over (above) the surface of the landfill waste. The compacting of the gas collection layer over the surface is optionally carried out in accordance with the particular conditions at the site;

Deposit and compact clay layer 21 above the surface of the gas collection layer (if any) at the optimum water content of the clay. The required dry density of clay layer should be not less than 95% of the maximum dry density of clay which is determined according to ASTM D698-12 Standard Test Methods for Laboratory Compaction Characteristics of Soil Using Standard Effort (12,400 ft-lb/ft$^3$ or 600 kN-m/m$^3$);

Deposit and compact gravelly sand layer 22 above the clay surface to a relative density ranging from 90% to 95%. The relative density expresses the degree of compactness of a soil with respect to the loosest and densest conditions as defined by standard laboratory procedures D4254-00 Standard Test Methods for Minimum Index Density and Unit Weight of Soils and Calculation of Relative Density;

Deposit and compact silt layer 23 above the gravelly sand surface to a relative density ranging from 80% to 85%.

The preparation of the landfill waste includes separation of materials from the waste for recycling or reclamation, deposit of the waste, spreading the waste to form an even layer and compacting the waste. An optional geotextile layer may be placed over the compacted waste. The result is a prepared layer of landfill waste.

The layers are deposited so that the thickness of silt layer falls between 0.3 m and 0.6 m with particle sizes less than 2 mm and the saturated water permeability ranging from $1\times10^{-8}$ to $1\times10^{-5}$ m/s.

The disclosed landfill soil cover system can be applied to both flat and sloping surface of a landfill. The slope angle of the disclosed landfill soil cover system should not be steeper than 1:3 (i.e., 1 vertical:3 height).

The landfill is scalable, meaning that the area of the landfill soil cover system is not limited. It can be determined in-situ according to actual field conditions such as the slope, the height and area of landfill. Additionally, in the disclosed landfill soil cover system, one or more trenches 43 for water drainage is constructed. The trenches 43 may, by way of non-limiting example, be constructed every 20-40 m in the horizontal direction. When weather is extremely dry for a long period, water can be recharged into gravelly sand layer 22 via trenches 43 from the upstream slope to saturate compacted clay layer 21. Any infiltrated rainwater should be stopped by the bottom clay layer and diverted from gravelly sand layer 22. The trenches 43 have a trapezoidal shape and constructed into the gravelly sand layer 22. The trenches 43 are used for recharging of the landfill cover during dry periods; however, they can also be used for drainage.

After construction, the disclosed landfill soil cover system 11 is used for preventing water infiltration and landfill gas emission from a domestic landfill under different weather conditions. The landfill soil cover system 11 prevents water infiltration into a landfill through the following working principles as represented in the graphs of FIGS. 2 and 3.

Figure 2:
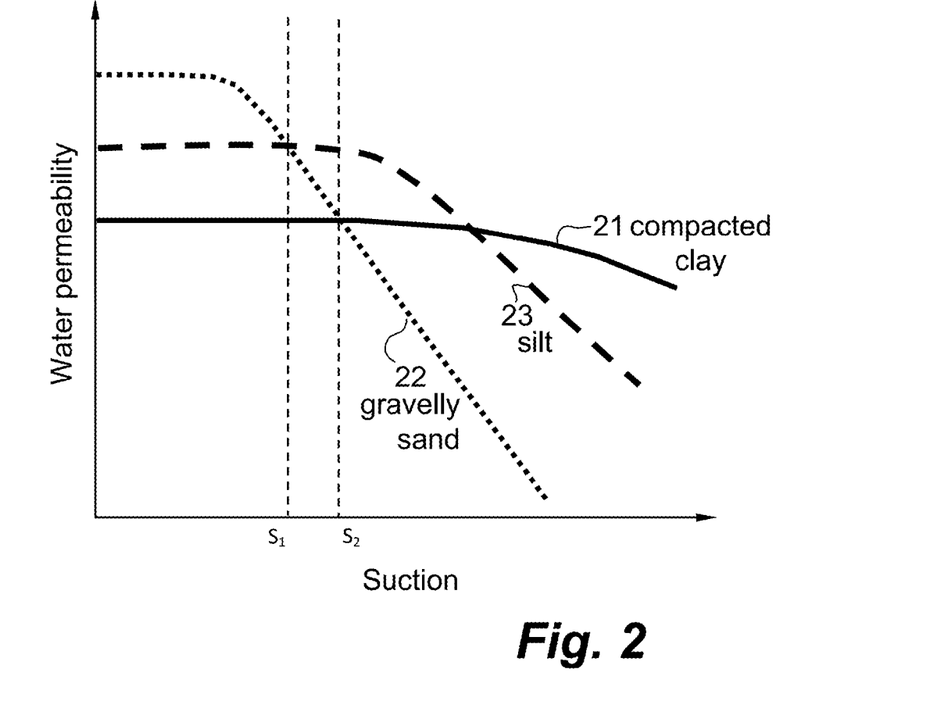
FIG. 2 is a graphical depiction illustrating the water permeability function of each soil layer in the disclosed landfill soil cover system.
Figure 3:
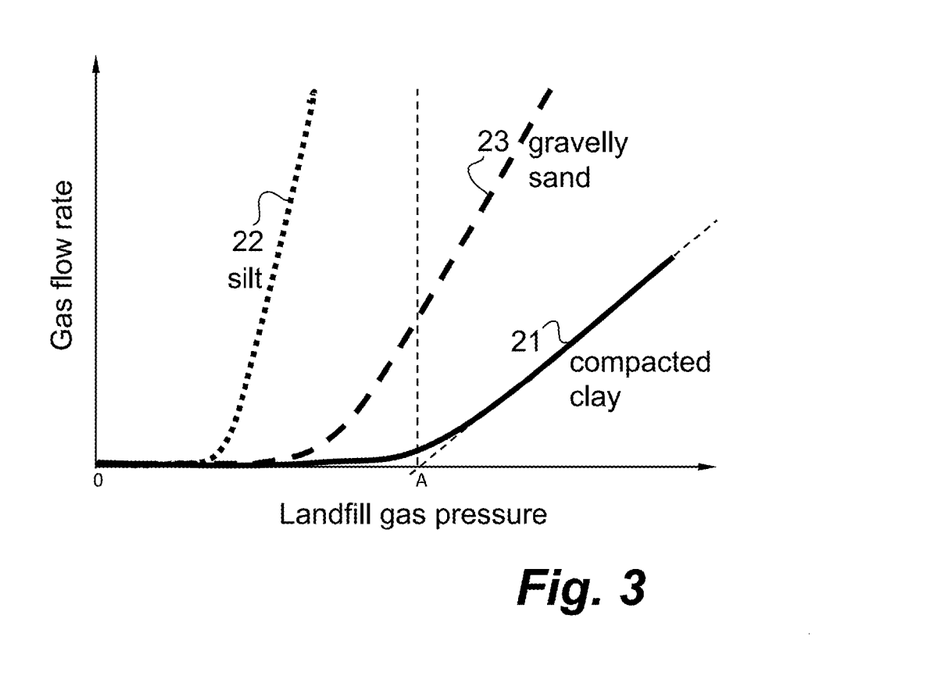
FIG. 3 is a a graphical depiction illustrating the relationship between gas flow rate and landfill gas pressure of each layer in the disclosed landfill soil cover system.

FIG. 2 is a schematic diagram illustrating the water permeability function of each soil layer; i.e., the relationship between water permeability (generally with a unit of m/s) and suction (generally with a unit of kPa). Suction is defined as the difference between pore gas and pore water pressure in a soil.

When a soil becomes drier as suction increases, both water content and water permeability of the soil decreases.

(1) When soil suction in a landfill cover system is less than S1; i.e., in humid climates, cover soils are nearly saturated or saturated. As illustrated in FIG. 2, water permeability of gravelly sand layer 22 is the highest while that of clay layer 21 is the lowest. The capillary barrier effects fail and water infiltrates into gravelly sand layer 22, since the water permeability of gravelly sand layer 22 is higher than that of silt layer 23. At this point, the infiltrated water is blocked by clay layer 21 due to the fact that clay layer 21 has low water permeability. Infiltrated water in this landfill cover system is mainly drained away through gravelly sand layer 22, as shown in FIG. 1, due to the high water permeability of gravelly sand layer 22.

(2) When soil suction in the landfill cover system lies between S1 and S2 (see FIG. 2); i.e., in moderately humid climates, cover soils are relatively wet. Water permeability of silt layer 23 is the highest while that of clay layer 21 is the lowest. Infiltrated water is mainly drained away through silt layer 23 because the silt layer has the highest water permeability. The water permeability of gravelly sand layer 22 is lower than that of silt layer 23, which minimizes downward seepage. Still, it is expected that there still may be some water seepage through gravelly sand layer 22. Under this circumstance, the water that has seeped through can be prevented from further infiltrating into underlying landfill by clay layer 21 due to its low water permeability, which is also lowest of the three layers.

(3) When soil suction in the landfill cover system is larger than S2; i.e., in semi-arid or arid climates, cover soils are relatively dry. Water permeability of silt layer 23 is much higher than that of gravelly sand layer 22. Infiltrated water stores in silt layer 23 and flows away in this layer, but no water infiltrates into gravelly sand layer 22. In this scenario, the effect is that of a capillary barrier.

The disclosed landfill soil cover system 11 prevents gas emission from a landfill through the following working principle:

The landfill waste 13 is likely to generate landfill gas, represented by thick arrows 47 in FIG. 1. FIG. 3 is a schematic diagram illustrating the relationship between gas flow rate and landfill gas pressure of each soil layer in the landfill soil cover system. When landfill gas pressure is relatively low, gas flow rate in the soil cover system is almost zero. When landfill gas pressure is larger than the limiting breakthrough gas pressure, at point A, of the compacted clay layer 21, landfill gas flow rate increases rapidly. This limiting breakthrough gas pressure at which landfill gas 47 starts to enter into soil rapidly is also called air-entry value. When landfill gas pressure is less than A, landfill gas 47 cannot penetrate into clay layer 21. The landfill gas pressure is generally less than 20 kPa in the field. Since the limiting breakthrough gas pressure (i.e., air-entry value) of the compacted clay layer 21 A is larger than typical landfill gas pressure, landfill gas 47 will not breakthrough clay layer 21. Therefore, the landfill cover system 11 can prevent landfill gas emission by adopting the compacted clay layer 21.

It should be noted that the gas pressure primarily relates to gas pressure, whereas soil suction primarily relates to the landfill's capability of drawing liquid. Both can occur simultaneously.

Figure 4:
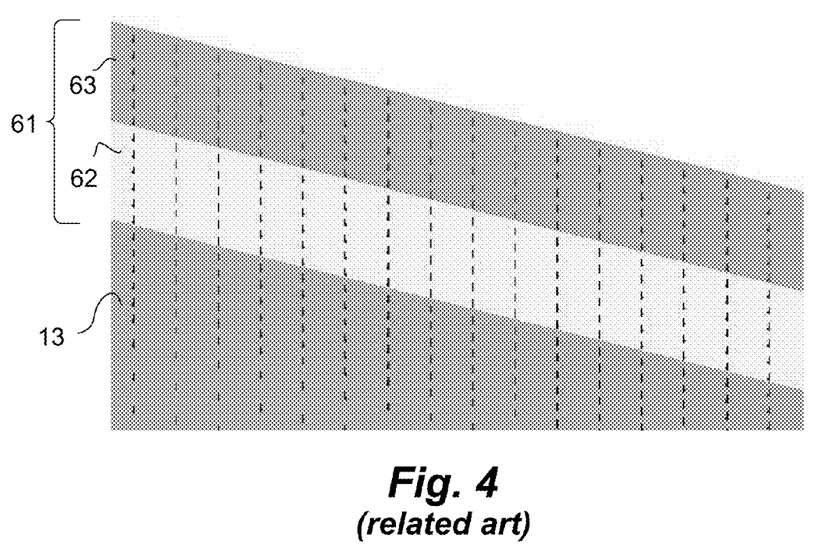
FIG. 4 (related art) is a schematic diagram showing computed result of numerical simulation for a prior art capillary barrier cover system.
Figure 5:
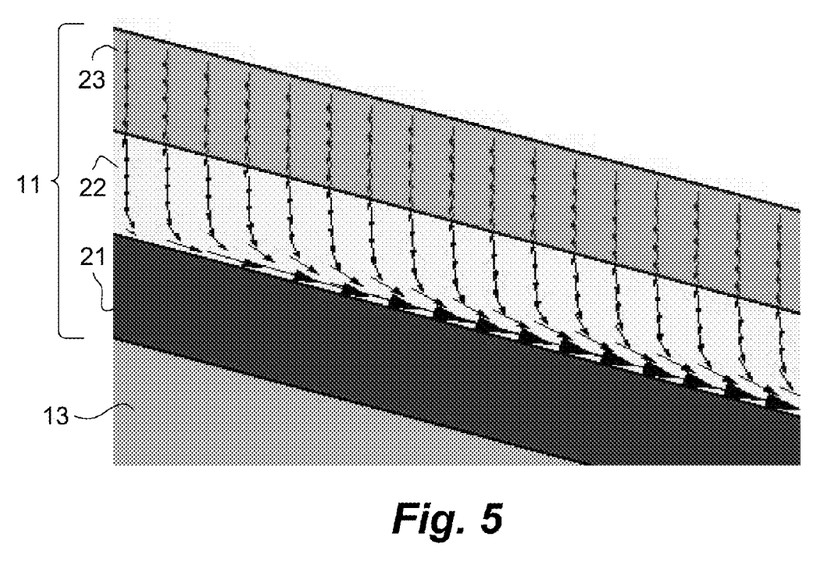
FIG. 5 is a schematic diagram showing computed results of numerical simulation for the disclosed landfill soil cover system.

FIG. 4 (related art) is a schematic diagram showing computed result of numerical simulation for a capillary barrier cover system. FIG. 5 is a schematic diagram showing computed results of numerical simulation for the disclosed landfill soil cover system. In order to demonstrate the performance of the landfill soil cover system 11, numerical simulations are carried out on both a capillary barrier cover system 61 and the disclosed landfill soil cover system 11 for comparison purposes. The capillary barrier cover system 61 only consists of a gravelly sand layer 62 with a silt layer 63 overlying a gravelly sand layer 62; i.e., without the compacted clay layer 21. Numerical simulations are performed by using GeoStudio 2007 software (From GEO-SLOPE International Ltd). Results of numerical simulations are shown in FIGS. 4 and 5. It is demonstrated that the landfill soil cover system 11 can prevent water infiltration into a landfill effectively while the capillary barrier cover system (without clay layer) cannot, when cover soils are nearly saturated or saturated.

Figure 6:
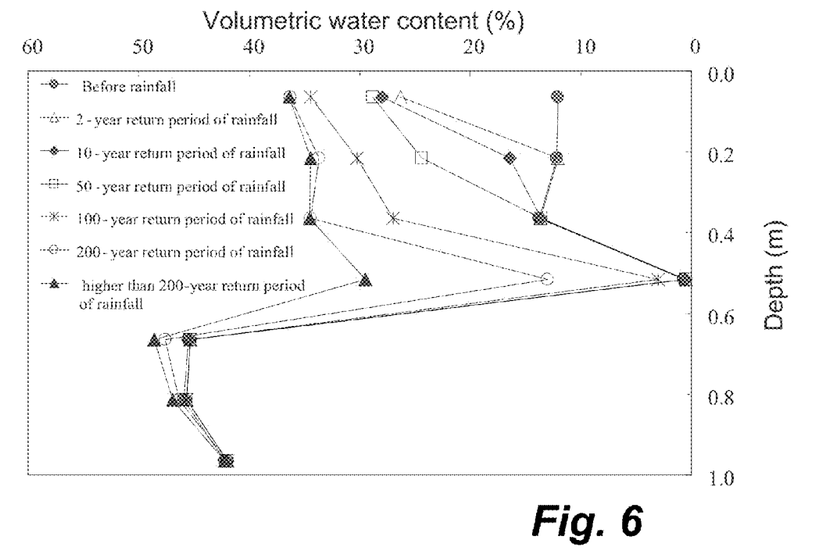
FIG. 6 is a graphical depiction showing experimental results for investigating and verifying any potential rainfall infiltration in the disclosed landfill soil cover system.

FIG. 6 is a graphical depiction showing experimental results for investigating and verifying any potential rainfall infiltration into the disclosed landfill soil cover system. It can be seen from the measured distributions of volumetric water content along depth in a landfill soil cover system 11 after different return periods of rainfall that the volumetric water contents at the bottom of clay layer 21 in the landfill soil cover system 11 remains almost unchanged, even under a heavy rainfall with a return period of 200 years or longer. This confirms that water cannot infiltrate through the clay layer 21 for a typical design life of less than 120 years.

Figure 7:
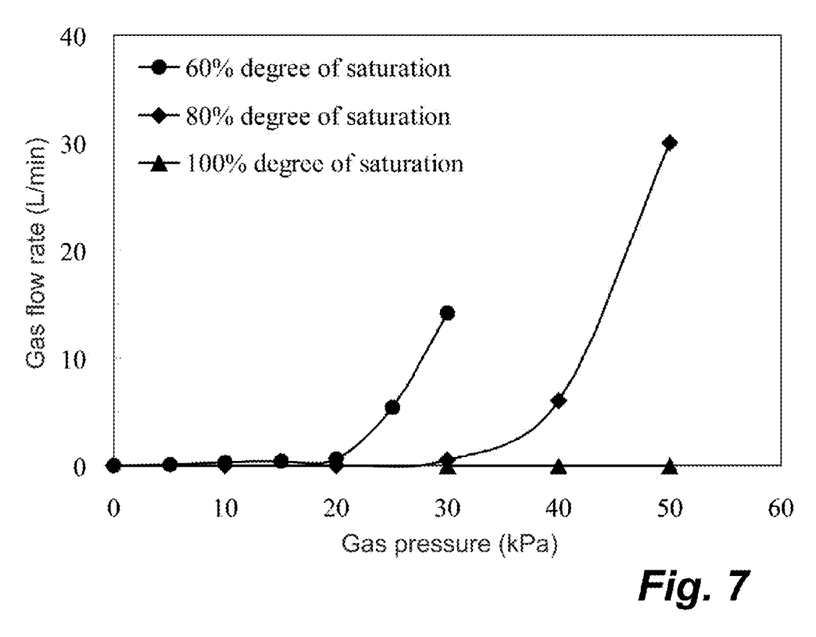
FIG. 7 is a graphical depiction showing experimental results for investigating and verifying any potential landfill gas emission in the clay layer of the disclosed landfill soil cover system.

FIG. 7 is a graphical depiction showing experimental results for investigating and verifying any potential landfill gas emission in the clay layer of the disclosed landfill soil cover system. It is evident from the figure that no gas can break through the saturated clay layer 21 (i.e., with degree of saturation of 100% for humid climate), even when gas pressure reaches 50 kPa. For the clay layer 21 with degrees of saturation of 80% and 60% (i.e., for humid and semi-arid climates), the breakthrough gas pressures are about 35 kPa and 22 kPa, respectively. Since the landfill gas pressure in the field is generally less than 20 kPa, the test results verify that the clay layer 21 in a landfill soil cover system 11 can prevent significant gas emission effectively, even when the degree of saturation of the clay layer is 60%, which is expected for arid climate.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for covering landfills, the method comprising:
preparing a flat or sloping surface of landfill waste;
depositing and compacting a clay layer over the surface of the landfill waste at an optimum water content of the clay;
depositing and compacting a gravelly sand layer above the clay surface;
depositing and compacting a silt layer above the gravelly sand surface,
the depositing of the layers comprises introducing an additional layer of compacted clay as a compacted bottom clay layer beneath a capillary barrier system, the capillary barrier system made of the silt layer overlying the compacted gravelly sand layer, whereby saturated water permeability of the silt layer, the gravelly sand layer and the compacted bottom clay layer increases first and then decreases from the top to the bottom layers, with the day layer compacted beneath the a capillary barrier system, which reduces water infiltration at dry conditions, and the compacted bottom clay layer reducing water infiltration at wet and saturated conditions and reducing landfill gas emission, using, as the deposited layers, all soils made of naturally occurring materials.

2. The method of claim 1, further comprising preparing a gas collection layer between the landfill waste and at least one of the clay, gravelly sand and silt layers.

3. The method of claim 1, further comprising preparing a gas collection layer between the landfill waste and the clay layer.

4. The method of claim 1, further comprising forming the compacted gravelly sand layer with a thickness that falls between 0.2 m and 0.3 m with particle sizes ranging from 0.5 to 5 mm and forming the compacted silt layer with a thickness between 0.3 m and 0.6 m with particle sizes less than 2 mm.

5. The method of claim 4, further comprising providing the compacted gravelly sand layer with a saturated water permeability not lower than $1\times10^{-4}$ m/s and forming the compacted silt layer with a saturated water permeability ranging from $1\times10^{-8}$ to $1\times10^{-5}$ m/s.

6. The method of claim 1, further comprising providing the compacted gravelly sand layer with a saturated water permeability not lower than $1\times10^{-4}$ m/s and forming the compacted silt layer with a saturated water permeability ranging from $1\times10^{-8}$ to $1\times10^{-5}$ m/s.

7. The method of claim 1, further comprising forming the compacted gravelly sand layer with a thickness that falls between 0.2 m and 0.3 m with particle sizes ranging from 0.5 to 5 mm and saturated water permeability not lower than $1\times10^{-4}$ m/s.

8. The method of claim 1, further comprising compacting the clay layer at an optimum water content immediately above landfill waste.

9. The method of claim 1, further comprising:
preparing a gas collection layer between the landfill waste and at least one of the clay, gravelly sand and silt layers;
compacting the clay layer at an optimum water content immediately above the gas collection layer.

10. The method of claim 1, further comprising forming the clay layer to have a thickness of clay layer between 0.3 m and 0.8 m with clay particle sizes less than 0.075 mm and saturated water permeability not higher than $1\times10^{-9}$ m/s.

11. The method of claim 1, further comprising forming the silt layer to between 0.3 m and 0.6 m with particle sizes less than 2 mm and saturated water permeability ranging from $1\times10^{-8}$ to $1\times10^{-5}$ m/s.

12. The method of claim 1, further comprising forming a trench for water drainage every 20-40 m in the horizontal direction.

13. A landfill system comprising the layers formed in accordance with claim 1.

\* \* \* \* \*

UNITED STATES PATENT AND TRADEMARK OFFICE
CERTIFICATE OF CORRECTION

PATENT NO. : 9,101,968 B2
APPLICATION NO. : 13/957547
DATED : August 11, 2015
INVENTOR(S) : Charles Wang Wai Ng et al.

Page 1 of 2

It is certified that error appears in the above-identified patent and that said Letters Patent is hereby corrected as shown below:

In the Drawings
Please Amend Fig. 3 as shown on the attached sheet
In the Specification
Column 1, Line 39- After "cover" and before ";" replace "systems" with --system--
Column 2, Line 59- After "is a" and before "graphical" please delete "a"
Column 6, Line 40- Please replace "3 height" with --3 horizontal--
Column 7, Line 59- Please replace "gas pressure" with --landfill gas pressure--
In the Claims
Column 8, Line 66- Please replace "day" with --clay--
Column 8, Line 67- After "the" and before "capillary" please delete "a"
Column 10, Line 25- After "Landfill" and before "system" please insert --cover--

Signed and Sealed this
Third Day of May, 2016

Michelle K. Lee
*Director of the United States Patent and Trademark Office*

Fig. 3